Aug. 15, 1933.  H. D. GEYER  1,922,431

FLEXIBLE BOOT FOR UNIVERSAL JOINTS

Filed June 29, 1929

Inventor
Harvey D. Geyer
By Spencer Hardman & Fehr
His Attorneys

Patented Aug. 15, 1933

1,922,431

UNITED STATES PATENT OFFICE 1,922,431

FLEXIBLE BOOT FOR UNIVERSAL JOINTS

Harvey D. Geyer, Dayton, Ohio, assignor to The Inland Manufacturing Company, Dayton, Ohio, a Corporation of Delaware Application June 29, 1929, Serial No. 374,772

4 Claims. (Cl. 64—89)

This invention relates to a flexible closure or casing especially adapted for use as a boot for a universal joint in an automobile propeller shaft when there is a relative axial movement between the parts connected by said flexible casing.

An object of this invention is to provide a simple, efficient and long-lasting flexible casing or boot which can be economically made.

A more specific object is to provide such a casing of molded rubber and fabric material which can withstand flexing in any direction as well as change of axial length without any substantial stress on the material thereof.

Another object is to provide such a casing which will highly resist increase in diameter due to any internal pressure therein, such as may be caused by forcing lubricant under pressure within the space enclosed thereby.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figure 1:
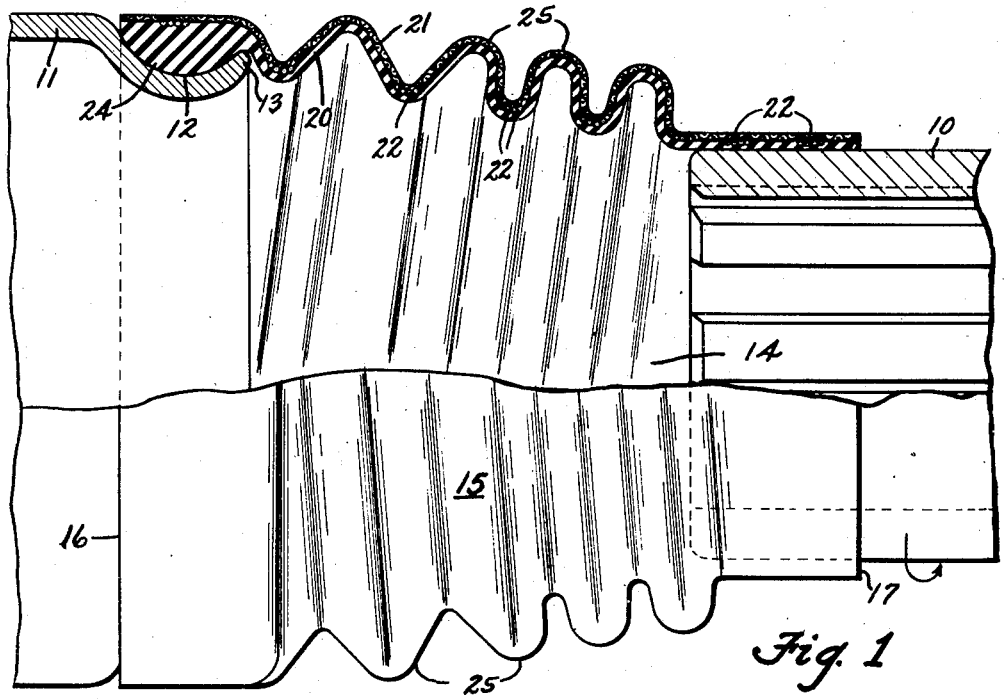
Fig. 1 is a view, partly in longitudinal elevation and partly in section, of a flexible casing made according to this invention.
Figure 2:
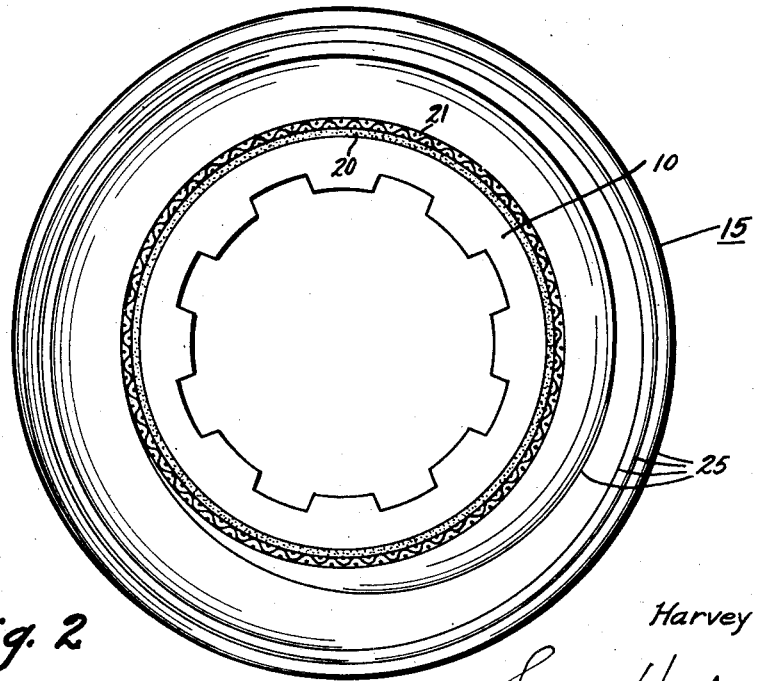
Fig. 2 is an end view of the casing detached from the parts connected thereby and looking at the casing from its smaller end.

Numeral 10 designates an end spline portion of the automobile propeller shaft, and 11 is an annular flange portion of a metal member opposed to the spline portion 10. A universal joint member (not shown) has one portion thereof in fixed relation with part 11 and the other portion thereof splined to part 10, so that parts 10 and 11 must rotate together, but part 10 may move axially toward or away from part 11 due to the spline connection of part 10 upon the universal joint member. The parts so far described are old prior to this invention and hence do not form a part of this present invention. This present invention provides the flexible casing 15 which has one open end 16 thereof held fixed upon the annular groove 12 of member 11, and the other open end 17 thereof held fixed upon the exterior of spline portion 10, and hence forming a complete casing or boot for the interior space 14 occupied by the universal joint or portions thereof (not shown).

Casing 15 is preferably a flexible molded rubber and fabric material molded to the form shown in the drawing. The interior layer 20 thereof is preferably made from an oil-resisting rubber compound so that the lubricant retained within said casing 15 will not harmfully affect the same to any substantial extent. Such oil-resisting rubber compounds are now well known in the rubber art. The outer layer 21 of casing 15 is preferably a rubberized cross-woven fabric covering which of course is vulcanized integral with the rubber layer 20 when the casing is vulcanized in a die mold. In order to provide strength to resist internal pressure within casing 15, a plurality of substantially non-extensible cords 22 are preferably molded within the corrugated walls of casing 15. Preferably these cords 22 extend peripherally at the bottom of the corrugations 25 as clearly shown in Fig. 1. Corrugations 25 obviously greatly increase the universal flexibility of casing 15 and permit large angular flexing thereof with a very minimum of stress upon the material thereof. These corrugations also permit large axial elongation or shortening with a very small amount of bending and therefore very little stress upon the material during such distortions.

Corrugations 25 are preferably of spiral or thread-like form, as clearly shown. An important advantage of this feature is that, in molding the casing 15 in this form, the inner core member of the vulcanizing mold (which of course is correspondingly grooved or threaded) may be removed after vulcanization simply by an unscrewing action. Preferably casing 15 is tapered lengthwise and the width of the grooves is somewhat greater at the larger end thereof. Both of these features facilitate the above-described unscrewing action when the inner core is removed after vulcanization. Of course the flexibility of the vulcanized casing 15 takes care of the variation in pitch of the corresponding threads on the core and causes the grooves in the casing to follow the grooves in the core during such unscrewing.

Casing 15 is provided with an annular thickened portion 24 of molded soft rubber which may be forced over the lip 13 of member 11 and snap into groove 12, thus securely attaching this end of the casing to member 11. The smaller end 17 is preferably of such diameter that it may be forced over the cylindrical outer surface of spline 10 with a very snug fit. The peripherally extending non-extensible cords 22 molded therein prevent any increase in diameter of the end portion 17 and so maintains the snug fit between portions 17 and spline 10, thereby preventing escape of lubricant at this point.

The spiral internal grooves in casing 15 also perform the function of throwing the liquid lubricant within the casing toward the left (as seen in Fig. 1) when the normal direction of rotation of the propeller shaft is as shown by the arrow in Fig. 1. This oil throwing characteristic, therefore, tends to pick up the oil at the bottom of casing 15 and throw it back over the universal joint parts therein, thus providing a better lubrication thereof.

While the form of embodiment of the present invention as herein disclosed, constitutes a preferred form, it is to be understood that other forms might be adopted, all coming within the scope of the claims which follow.

What is claimed is as follows:

1. As an article of manufacture, a molded rubber and fabric casing having opposite open ends adapted to be fixed respectively to two spaced relatively movable members, said casing being tapered lengthwise and having a spiral peripheral corrugation therein, the turns of said corrugation being relatively wide at the larger diameter end of said casing and decreasing in width toward the smaller end thereof.

2. A universally flexible boot comprising a molded rubber and fabric casing having opposite open ends adapted to be fixed respectively to two spaced universally relatively movable members, said casing having a spiral peripheral corrugation therein, and reinforced against increase in diameter by substantially non-extensible fabric cords molded therein and lying wholly within the valleys of said spiral corrugation.

3. As an article of manufacture, a molded rubber and fabric universally flexible casing adapted for use as a boot for a universal joint, said casing having peripheral grooves molded therein whereby to facilitate axial elongation thereof, and reinforced against increase in diameter by substantially non-extensible fabric cords molded therein.

4. As an article of manufacture, a molded rubber and fabric universally flexible casing adapted for use as a boot for a universal joint, said casing having peripheral grooves molded therein of such depth as to materially facilitate axial elongation thereof, and reinforced against increase in diameter by substantially non-extensible cords molded therein, said cords lying adjacent the bottoms of said grooves.

HARVEY D. GEYER.